(12) United States Patent
Lee

(10) Patent No.: US 6,530,001 B1
(45) Date of Patent: Mar. 4, 2003

(54) COMPUTER SYSTEM CONTROLLING MEMORY CLOCK SIGNAL AND METHOD FOR CONTROLLING THE SAME

(75) Inventor: Jung-Keun Lee, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/419,774

(22) Filed: Oct. 18, 1999

(30) Foreign Application Priority Data

Oct. 16, 1998 (KR) .............................. 98-43756

(51) Int. Cl.[7] .............................................. G06F 12/00
(52) U.S. Cl. ..................... 711/154; 711/167; 710/58; 713/500
(58) Field of Search .............................. 710/58, 60, 62, 710/74; 711/154, 167, 5; 713/100, 500, 501, 600, 601

(56) References Cited

U.S. PATENT DOCUMENTS

| | | | |
|---|---|---|---|
| 5,394,541 A | * | 2/1995 | Chesley et al. .............. 711/111 |
| 5,509,138 A | | 4/1996 | Cash et al. |
| 5,522,064 A | * | 5/1996 | Aldereguia et al. ......... 365/203 |
| 5,680,595 A | | 10/1997 | Thomann et al. |
| 5,761,533 A | | 6/1998 | Aldereguia et al. |
| 5,862,368 A | | 1/1999 | Miller et al. |
| 5,887,146 A | | 3/1999 | Baxter et al. |
| 5,903,747 A | | 5/1999 | Casal |
| 5,903,916 A | | 5/1999 | Pawlowski et al. |
| 5,991,850 A | * | 11/1999 | Ryan ..................... 365/230.03 |
| 6,178,518 B1 | * | 1/2001 | Toda .......................... 709/400 |
| 6,330,650 B1 | * | 12/2001 | Toda et al. ................. 365/233 |

* cited by examiner

*Primary Examiner*—Matthew Kim
*Assistant Examiner*—Christian P. Chace
(74) *Attorney, Agent, or Firm*—Robert E. Bushnell, Esq.

(57) ABSTRACT

A computer system controlling a memory clock signal of a DIMM (dual in-line memory module) socket is described and which includes a processor controlling a 66 MHz or a 100 MHz system bus clock signal to be generated, a DIMM memory module supporting the 66 MHz or the 100 MH system bus clock signal, a clock generator generating the 66 MHz or the 100 MHz system bus clock signal by receiving control of the processor, a clock buffer, a first and a second system controllers. The clock generator and the clock buffer store setting data according to memory data of a memory module from a first system controller. The first and the second system controllers control a memory bus clock signal corresponding to an inserted single-sided type or double-sided type DIMM memory module to be outputted. As a result, a clock signal is cut off to an unused memory "model" module socket or an unused clock signal of a using memory module socket is cut off in response to "kind of an inserted" insertion of a memory module.

6 Claims, 12 Drawing Sheets

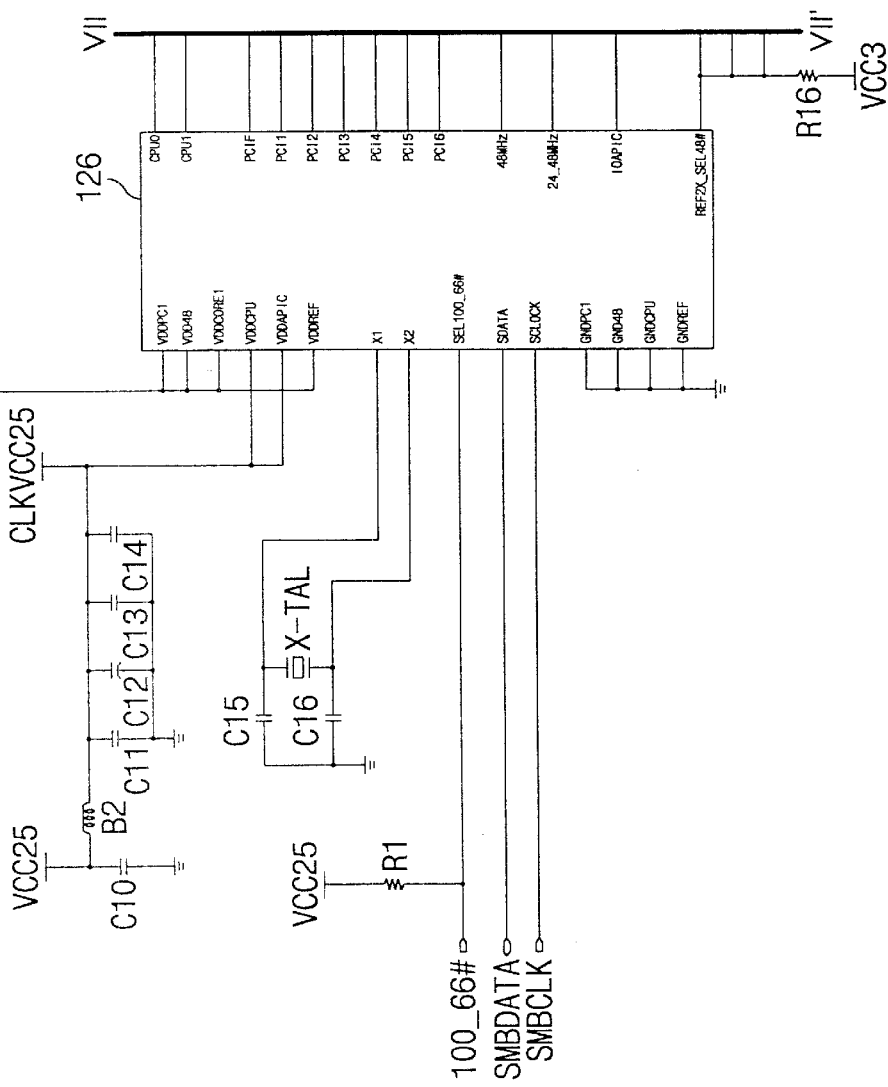

COMPUTER SYSTEM CONTROLLING MEMORY CLOCK SIGNAL AND METHOD FOR CONTROLLING THE SAME

CLAIM OF PRIORITY

This application makes reference to, incorporates the same herein, and claims all benefits accruing under 35 U.S.C. §119 from my application entitled COMPUTER SYSTEM CONTROLLING MEMORY CLOCK SIGNAL AND METHOD FOR CONTROLLING THE SAME earlier filed with the Korean Industrial Property Office on Oct. 16, 1998 and there duly assigned Serial No. 43756/1998.

BACKGROUND OF THE INVENTION

1. Field of the Invention

The present invention relates to computer systems generally, and, more particularly, to a computer system and process for controlling memory clock signals.

2. Related Art

A system bus of a computer system is an operational path where a central processing unit (i.e., a CPU), a memory, and peripheral devices transmit data to one another. For example, a 100 mega-Hertz system bus transmission speed means that data is transmitted at a speed of 100 mega-Hertz. Chipset manufacturing companies intending to improve system bus speed have indicated that the current 66 MHz system bus transmission speed (often refer to as "PC 66") can not keep up with the increasing speed of the newer generations of central processing units.

Recent efforts in the art include U.S. Pat. No. 5,680,595 to Thomann et al. entitled PROGRAMMABLE DATA PORT CLOCKING SYSTEM FOR CLOCKING A PLURALITY OF DATA PORTS WITH A PLURALITY OF CLOCKING SIGNALS IN AN ASYNCHRONOUS TRANSFER MODE SYSTEM, issued Oct. 21, 1997; U.S. Pat. No. 5,509,138 to Cash et al, entitled METHOD FOR DETERMINING SPEEDS OF MEMORY MODULES, issued on Apr. 16, 1996; U.S. Pat. No. 5,761,533 to Aldereguia et al., entitled COMPUTER SYSTEM WITH VARIED DATA TRANSFER SPEEDS BETWEEN SYSTEM COMPONENTS AND MEMORY, issued on Jun. 21, 1998; U.S. Pat. No. 5,862,368 to Miller et al., entitled PROCESS TO ALLOW AUTOMATIC MICROPROCESSOR CLOCK FREQUENCY DETECTION AND SELECTION, issued on Jan. 19, 1999, U.S. Pat. No. 5,887,146 to Baxteretal., entitled SYMMETRIC MULTIPROCESSING COMPUTER WITH NON-UNIFORM MEMORY ACCESS ARCHITECTURE, issued on Mar. 23, 1999; U.S. Pat. No. 5,903,747 to Casal, entitled MICROPROCESSOR CLOCKING CONTROL SYSTEM, issued on May 11, 1999; U.S. Pat. No. 5,903,916 to Pawlowski et al., entitled COMPUTER MEMORY SUBSYSTEM AND METHOD FOR PERFORMING OPPORTUNISTIC WRITE DATA TRANSFERS DURING AN ACCESS LATENCY PERIOD WITHIN A READ OR REFRESH OPERATION, issued on May 11, 1999; and U.S. Pat. No. 5,522,064 to Aldereguia et al., entitled DATA PROCESSING APPARATUS FOR DYNAMICALLY SETTING TIMING IN A DYNAMIC MEMORY SYSTEM, issued on May 28, 1996. The efforts proposed by these references are, in my opinion, unsatisfactory. Aldereguia et al, U.S. Pat. No. 5,522,064 for example, proposes to use a programmable memory controller to store information that defines the timing requirements of each of the modules.

In an effort to address the perceived need for a system bus with a transmission speed that is more compatible with the newer microprocessors, Intel Corporation has developed a 100 MHz system bus transmission speed (often referred to below as "PC 100") in response to the fast developing speed of a CPU. That is, the PC 100 has a system bus transmission speed that is able to operate at 100 MHz. For example, the PC 100 can be used in a main board having with an Intel 440BX chipset driven by a high speed CPU such as a Pentium II microprocessor operating at 350 MHz.

The PC 100 system bus has two significant advantages. The first advantage is an improvement in system performance. For example, the operational time of a 66 MHz system bus is $66 \cdot 10^5$/seconds. With the PC 100 system bus, 64 bits are operated upon at one time and 8 bits are equal to 1 byte, 528 MB/second may be transmitted via the PC 66 system bus. On the other hand, the operation time of a 100 MHz system bus is $10^8$/seconds. Thus, 800 MB/sec is transmitted via the PC 100 system bus, an improvement of data transmission speed of 51%.

The second advantage is the stability of peripheral devices that are used in conjunction with a PC 100 system bus. Since the processing speed of the 66 MHz system bus is too fast, a peripheral component interconnection bus (i.e., a PCI bus) is operated at 33 MHz/sec. Therefore, peripheral devices such as a graphic card and a hard disk drive are operated at 33 MHz. If a PC 66 system bus is converted by overclocking the bus from 66 MHz to 100 MHz, the PCI bus will be operated at 37.5 MHz (i. e., 13% over PCI limitations). Therefore, operational and functional errors such as shutdown may be generated by the overclocking of the PC 66 system bus. With a PC 100 system bus however, the PCI bus is operated at ⅓ of the clock speed (i.e., at 33.3 mega-Hertz), so that 33.3 MHz operational frequency of the PCI bus meets the PCI standard. Despite the use of a high system bus clock, high speed peripheral devices can still be stably used. Moreover, the 100 MHz system bus will be able to accommodate a high speed CPU of the next generation of microprocessors.

Despite these efforts in the art, I have found that it is conventional practice to either continuously supply clock signals to vacant memory module sockets or, when the memory clock signal to an unoccupied dual in line memory module socket is terminated, the unused memory clock signals are continuously supplied to the memory modules mounted in the occupied sockets. Consequently, computer systems subjected to conventional clock signal protocol are often unnecessarily exposed to electromagnetic interference (i.e., EMI). Thomann, U.S. Pat. No. 5,680,595, in an effort to provide a programmable data port clocking system, for example, relies upon mode storage to supply the setting data for a memory module, a mode decoder that decodes the setting data to provide a plurality of signals that correspond to a least one transfer mode, a mode controller that regulates the clock signal for the transfer mode that is output in response to the output signals, and a switching stage that outputs clock signals to a plurality of ports in response to the clock signal. Cash, U.S. Pat. No. 5,509,138, attempts to provide memory access in accordance with the different speeds of the memory modules, but requires the reading of the setting data defining the size, speed and composition code of the memory module, a decision about the position of data for the memory module, and the storage of the speed of the memory module whenever the memory module is included in the entry and the storage of a lowest speed for the memory module when that module is not included in the entry. These systems are not particularly simple and require more than a single operational cycle to implement.

SUMMARY OF THE INVENTION

It is therefore an object of the present invention to provide an improved computer system.

It is another object to reduce the exposure of a computer system to electromagnetic interference.

It is still another object to provide a computer system and process able to terminate application of memory clock signals to vacant memory module sockets.

It is yet another object to provide a computer system and process able to terminate application of unnecessary memory clock signals to occupied memory module sockets.

It is still yet another object to provide a computer system and process able to automatically terminate the application of memory clock signals to an occupied memory module socket that do not conform to the bus speed of the memory module occupying that socket.

It is a further object to provide a computer system an process able to automatically adjust the application and frequency of the memory clock signals applied to each of a plurality of memory module sockets to conform to determinations of whether each socket is occupied, to determinations of the type of memory module that is resident within each socket, and to determinations of the bus speed of each memory module that is resident within each socket.

It is a still further object to implement a computer system and process that is able to cut off a clock signal to an unused memory module socket of a computer system and an unused clock signal among the clock signals being applied to a memory module socket that is in use.

It is a yet further object to provide a computer system and control process capable of interrupting an unused clock signal to a corresponding module type of a mounted memory module.

It is a still yet further object to implement a computer system and process of controlling memory clock signals for the computer system.

It is also an object to provide a computer system and process of adjusting memory clock signals applied to memory modules to conform to the type of memory module and the corresponding bus speed of the memory module.

It is an additional object to provide a simple, and readily implementable computer system and process of applying memory clock signals that conform to the type of memory module and the corresponding bus speed of the memory module within each of a plurality of memory module sockets.

It is a still additional object to provide a computer system and process able to both terminate memory clock signals to vacant memory module sockets and to terminate unnecessary memory clock signals to occupied memory module sockets.

These and other objects may be attained according to the principles of the present invention, with a computer system and control process using a processor that provides a control signal to generate a first or a second bus clock signal and at least one memory module, constructed with a first system controller reading main data from the memory module and then generating setting data corresponding to the memory data; and a clock generator responding to reception of the control signal by providing a first or a second host clock signal corresponding to the setting data. A second system controller responds to reception of the first or second host clock signal by generating a first or a second reference clock signal that is referenced to a memory clock signal for the memory module, and a clock buffer receives the first or the second reference clock signal and then generates first through fourth memory clock signals corresponding to the setting data for the memory module. If the memory module is a single-sided type memory module, the clock buffer cuts off unused memory clock signals for the single-sided memory module among the first to the fourth memory clock signals through the setting data.

The first system controller may transmit the memory data and the setting data through a system management bus (i.e., a SM bus). The clock generator and the clock buffer may include a register that stores the setting data. If the memory module is a single-sided type memory module, a clock buffer may disable the second memory clock signal and the fourth memory clock signal when the first reference clock signal is received, and may disable the third memory clock signal and the fourth memory clock signal when the second reference clock signal is received.

According to the present invention, a process for using a computer system to control a memory clock signal to at least one dual in-line memory module (i. e., a DIMM), may enable the first through fourth memory clock signals to all memory sockets, determine whether a memory module is inserted into a socket among the enabled memory sockets; determine the kind of the inserted memory module that has been inserted into each of the enabled memory sockets, if any memory module has been inserted into any of the memory sockets; and maintain enablement of the first to fourth memory clock signals to a memory socket when the memory module in that socket is determined to be a double-sided type memory module. If the memory module within the memory socket is found to be a single-sided memory module, a determination is made of whether the bus speed of the memory module is the first speed or the second speed. Memory clock signals corresponding to the second speed for the memory module among the first to the fourth memory clock signals are disabled when the bus speed for the resident memory module is determined to be the first speed; and memory clock signals corresponding to the first speed of the memory module among the first to the fourth memory clock signals are disabled when the bus speed corresponding to the resident memory module is determined to be the second speed. With one embodiment of the present invention, if no memory module is found to have not been inserted into a memory module socket (that is, if the socket is unoccupied by a memory module), the first through the fourth memory clock signals for that memory module socket are disabled.

Thus, in the practice of the present invention, a microprocessor is able to determine whether a memory module has been inserted into a memory module socket with the processing steps of the basic input and output system (i.e., the BIOS) and then read memory data for a memory module where a system controller is determined. The microprocessor may store the memory data read in a clock generator and a clock buffer. As a result, an unused clock signal for a resident memory module is controlled in conformity with the kind of memory module found to be inserted into the memory module socket and in response to either a first or a second system bus clock signal.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
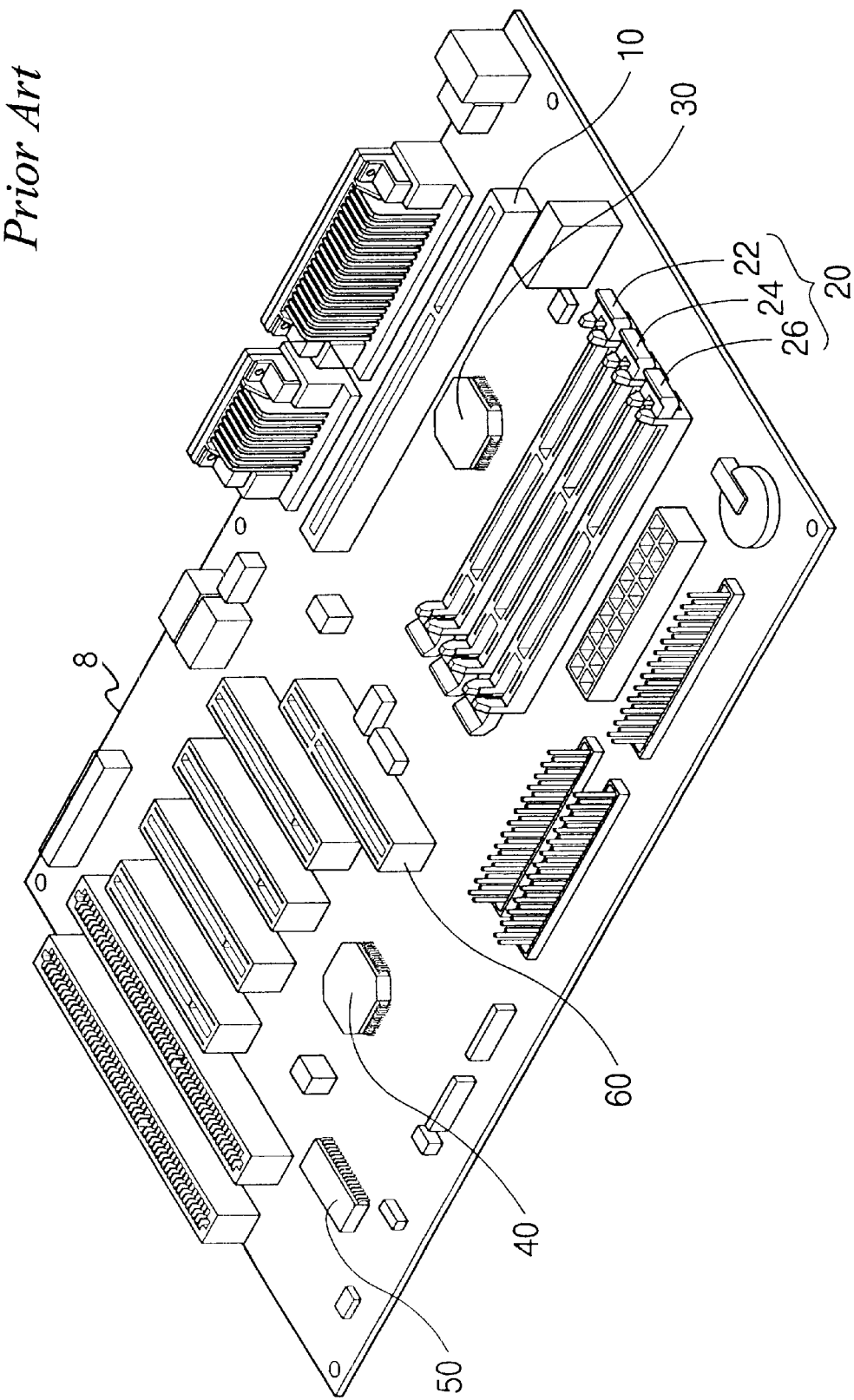
FIG. 1 is a perspective view illustrating a main board of a computer system.

Turning now to the drawings, FIG. 1 illustrates a main board (i.e., the mother board) of a computer system mounting a central processing unit such as an Intel Pentium II processor or alternatively, a processor (CPU) that is compatible to an Intel Pentium II. The main board controls the generation of either a 66 MHz or a 100 MHz bus clock. The main board 8 includes a surface mounted slot 10 upon which the CPU processor may be mounted, and an array of sockets 20 formed by a plurality of three or more individual and discrete sockets 22, 24, and 26 into which one or more main memory modules may be inserted. Slot 10 is one type of slot for mounting, for example, an Intel Pentium II processor and the concomitant heat sink and instrumental mechanism for supporting a cooling fan. The array of sockets 20 may, by way of example, be formed with three or four sockets 22, 24, 26 that serve as connectors for extending the main memory. A dual in-line memory module (i.e., a DIMM) may be inserted into each of the sockets 22, 24, and 26. Memory bus clock signals fitted for either a 66 MHz or a 100 MHz system bus speed are applied to each DIMM when write or read operations are performed upon the information stored on the DIMMs. The computer system further includes a basic input and output system (i.e., a BIOS chip) 50 that determines whether a main memory has been inserted by conducting a power on self-test (i.e., a POST), a host to PCI bridge controller 30, and a PCI to ISA bridge controller 40. The operational, bias and power connections formed on the surfaces of main board 8 between the pins of the various chips are not shown in FIG. 1.

Figure 2:
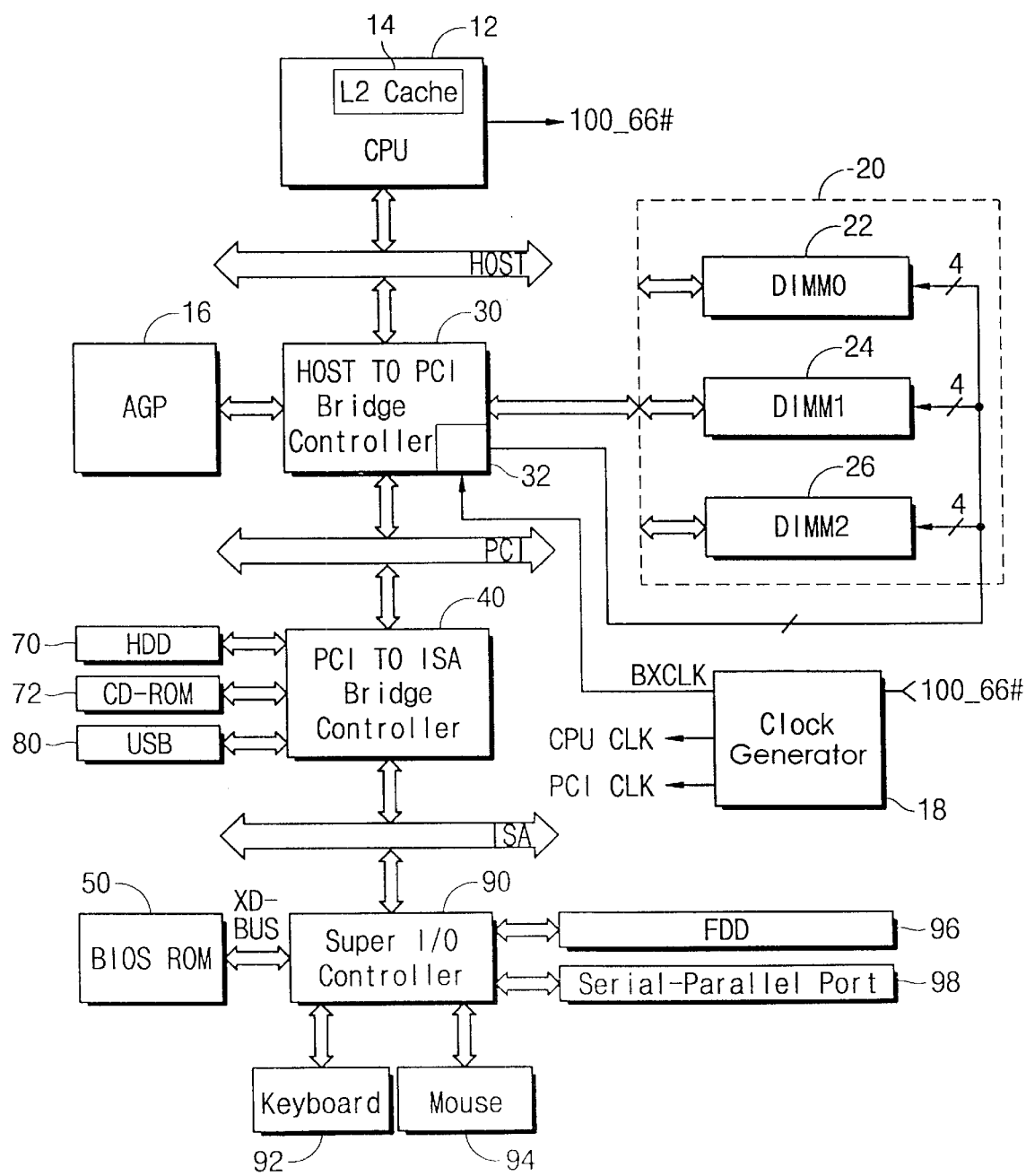
FIG. 2 is a block diagram illustrating configuration of a computer system shown in FIG. 1.
Figure 3:
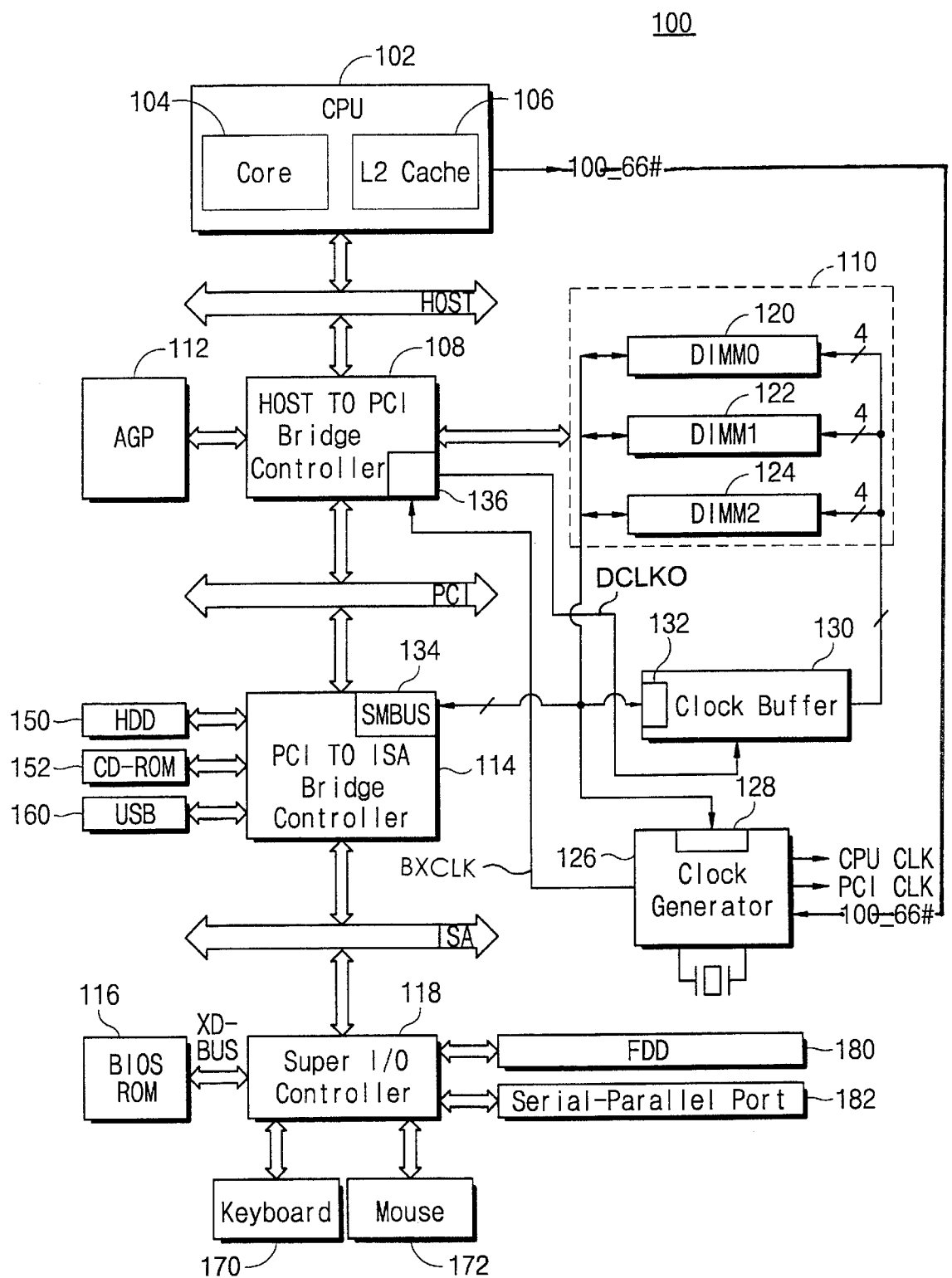
FIG. 3 is a block diagram illustrating configuration of a computer system constructed in accordance with the principles of the present invention.

FIG. 2 illustrates a single line and bus configuration of the computer system shown in FIG. 1. This computer system includes a main board that determines whether a memory module has been mounted within a socket by using the processing routine stored in basic input and output system read only memory 50 (i.e., BIOS ROM 50), and then cuts off a memory bus clock signal for any socket 22, 24, 26 in array 20 that is not occupied by a dual in line memory module.

The CPU 12 may, for example, be an Intel Pentium II processor and include an internal cache memory 14. CPU 12 may also include a host to PCI bridge controller 30 located between a host bus and a PCI bus, and the PCI to ISA bridge controller 40 located between the PCI bus and an ISA bridge controller. The PCI to ISA bridge controller 30 may, for example, be an Intel 440BX chipset that performs the function of a host to PCI interface, memory controller, and an accelerated graphics port (i.e., an AGP) controller 16. The PCI to ISA bridge controller 40 may, for example, be an Intel PIIX4E chipset or a chipset compatible with the Intel PIIX4E chipset, that is able to serve as a PCI to ISA interface, IDE controller, and USB controller.

The CPU 12 outputs a control signal 100_66# for selecting either a 66 MHz or a 100 MHz system bus clock signal in response to bus speed of a memory module inserted into one of module sockets 22, 24, 26. Afterwards, a clock generator 18 outputs either a 66 MHz or a 100 MHz host clock signal BXCLK to the host to PCI bridge controller 30 in response to the control signal 100_66#. Afterwards, the host to PCI bridge controller 30 outputs each of a first through fourth memory clock signals CLK0, CLK1, CLK2 and CLK3 to each of memory module sockets 22, 24, and 26 within the array 20 of sockets. When power is supplied to the computer system, a CPU determines whether a memory module has been inserted into the memory module socket 20 and its insertion time during the power on self-test of a BIOS ROM 50.

At this time, all of the first through the fourth memory clock signals CLK0–CLK3 for the memory module sockets 22, 24, 26 are enabled and memory clock signals CLK0–CLK3 are disabled for a memory module socket that has been determined to have no memory module inserted. The first through the fourth memory clock signals CLK0–CLK3 are applied to each memory module socket in conformance with the determination of system bus transmission speed. Accordingly, four memory clock signals are continuously supplied to vacant sockets for dual in-line memory modules and, as mentioned earlier, although the memory clock signals for a vacant dual in-line memory module socket maybe cut off, unused memory clock signals are continuously supplied to all of the occupied sockets. Consequently, these computer systems may unnecessarily exposed to electromagnetic interference.

Referring now to the drawings illustrated by FIGS. 3 through 11, embodiments of the various features of computer systems and processes that implement the principles of the present invention are illustrated in detail. These computer systems 100 may be constructed with a central processing unit 102, a main memory 110, and a basic input and output system 116. The central processing unit 102, including a core 104 and a second level two cache memory 106 (i.e., a L2 cache memory), outputs a control signal 100_66# in order to select the generation of either a 66 MHz or a 100 MHz system bus clock signal. The main memory 110 is inserted into one or more of memory module sockets 120, 122, and 124 upon which at least one dual in-line memory module has been inserted. Those sockets are part of a memory bank that generally includes three or four sockets.

Computer system 100 includes a host to PCI bridge controller 108, a PCI to ISA bridge controller 114, a clock generator 126, and a clock buffer 130. Host to PCI bridge controller 108 is located between a host bus and a PCI bus for the computer system 100, and serves as a host to PCI interface, a memory controller, an interface to accelerated graphic port (i.e., an AGP) controller 112, a source of a plurality of clock signals, and test controller. Host to PCI bridge controller 108 receives a host clock signal BXCLK corresponding to either a PC 66 or PC 100 system bus transmission speed from the clock generator 128 and then, in response, applies a reference clock signal DCLK0 to the clock buffer 130.

The PCI to ISA bridge controller 114, is located between a PCI bus and an ISA bus, and includes a PCI to ISA interface, an BDE controller, an universal serial bus controller (i.e., USB controller), and an system management bus controller. Accordingly, the PCI to ISA bridge controller 114 reads memory data for the memory modules that have been inserted into sockets 120, 122, 124 of main memory 110, through system management bus 134 and then outputs setting data corresponding to the memory data to clock buffer 130 and clock generator 126.

Figure 5:
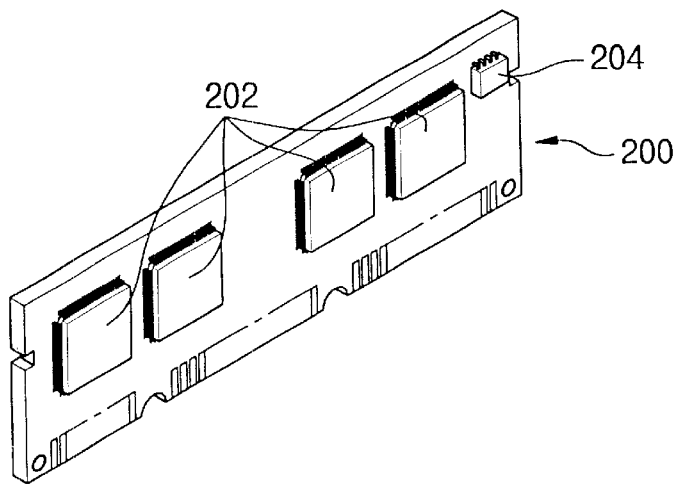
FIG. 5 is a perspective view illustrating a dual in-line memory module (i.e., a DIMM)

The memory data, stored in a ROM (EEPROM) 204 of a memory module 200 shown in FIG. 5, includes the capacitance of random access memories (i.e., RAM's) 202 and the column address and row address timing (e.g., CAS timing and RAS timing) for random access memories 202. The memory module 200 shown in FIG. 5, may be inserted into any one of the memory module sockets 120, 122, and 124, and data may be written onto and read from the random access memories 202 while the ROM (EEPROM) 204 mounted on module 200 beside RAM's 202, stores memory data such as the capacitance of the memory and the timing for the memory. The memory data supports the serial presence detect (i.e., the SPD) specification instituted by the Intel Corporation and transmits mutual SM data and a clock signal to the PCI to ISA controller 114 through the system management bus of computer system 100.

Referring to FIG. 3 again, the clock generator 126 includes a register 128 that stores the setting data received from the PCI to ISA bridge controller 114 corresponding to the memory data for each memory module 200 within main memory 110. The clock generator 126 responds to the control signal 100_66# received from the central processing unit 102 and then outputs a host clock signal BXCLK (with clock components BXHCLK and BXPCLK) to the host to PCI bridge controller 108, and outputs a CPU clock signal with the CPU CLK and a PCI clock signal PCI CLK clock components that are necessary for every system operation.

The clock buffer 130 includes a register a register 132 that stores the setting data corresponding to the memory data for each memory module that was received from the PCI to ISA bridge controller 114. Additionally, clock buffer 130 receives a reference clock signal DCLK0 from the host to PCI bridge controller 108 and then outputs the corresponding ones of the first through fourth memory clock signals CLK0, CLK1, CLK2, CLK3 to each of the memory module sockets 120, 122, and 124 in response to the setting data.

Figure 4:
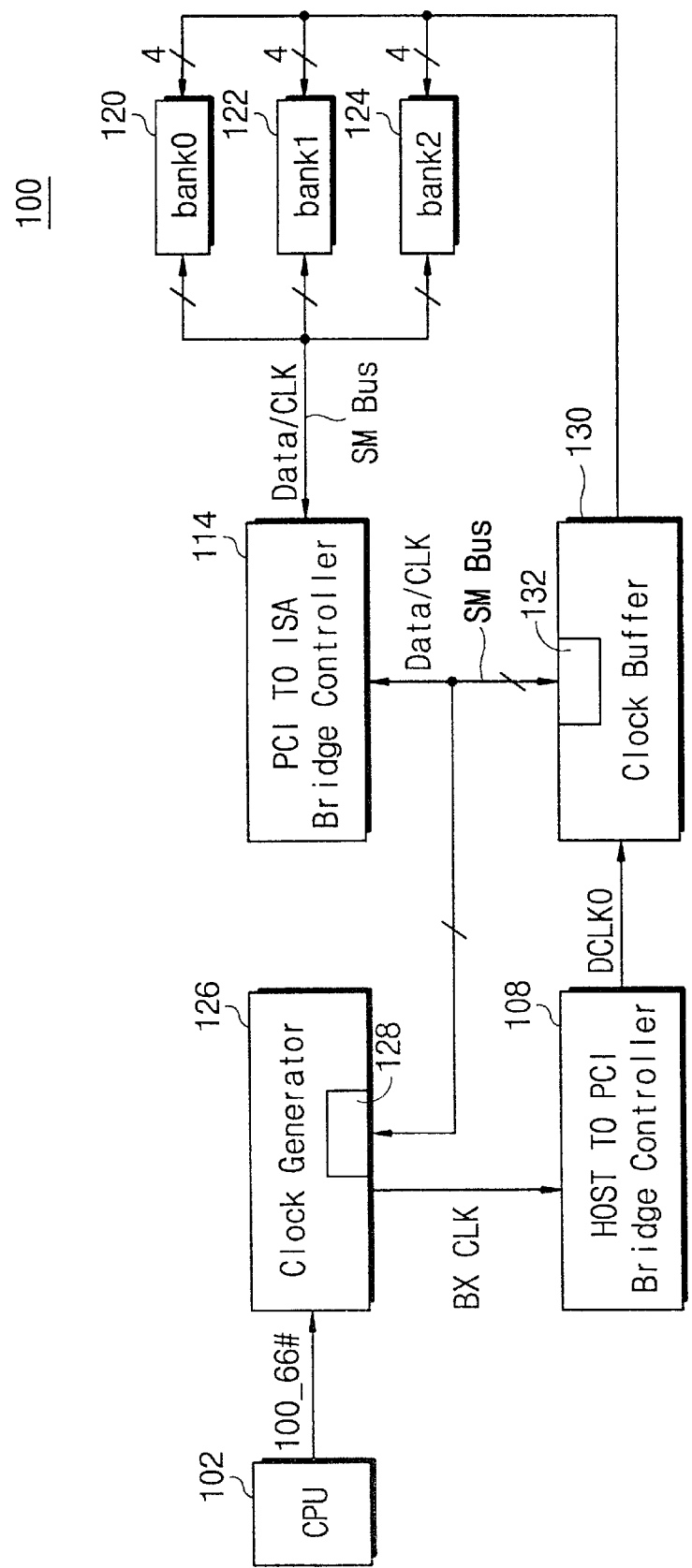
FIG. 4 is a block diagram illustrating one configuration of a clock signal path for the computer system shown in FIG. 3.

Referring now to FIG. 4, computer system 100 supports 66/100 MHz system bus transmission speeds. Accordingly, both the central processing unit 102 and the main memory 110 support the 66/100 MHz system bus speed. When electrical power is supplied to the computer system 100, central processing unit 102 is controlled by a BIOS 116 and applies control signal 100_66# to system clock generator 126 in order to select a system clock signal for a PC 66 or a PC 100 system clock signal from clock generator 130. Additionally, central processing unit 102 determines whether any memory module is present in each of the memory module sockets 120, 122, and 124 and determines the kind of a memory module that is present through the use of the processing routine used by the basis input and output system chip 116.

At this time, PCI to ISA bridge controller 114 reads memory data stored in the ROM 204 for the memory module 200 inserted into each of the sockets 120, 122, 124, through the system management and then stores the setting data corresponding to the memory data in each of registers 128 and 132 respectively for clock generator 126 and clock buffer 130. Afterwards, clock generator 126 responds to control signal 100_66# and then outputs a host clock signal BXCLK corresponding to a system clock signal to host to PCI bridge controller 108. Host to PCI bridge controller 108 in turn, responds to host clock signal BXCLK by applying a reference clock signal DCLK0 to clock buffer 130. Consequently, clock buffer 130 outputs the first through fourth memory clock signals CLK0, CLK1, CLK2, CLK3 to each of the memory module sockets 120,122, and 124 in conformity with the setting data stored in the internal register 132 of clock buffer 130, while cutting off clock signals to any vacant memory module socket 120, 122 and 124 within main memory 110.

Figures 6A, 6B:
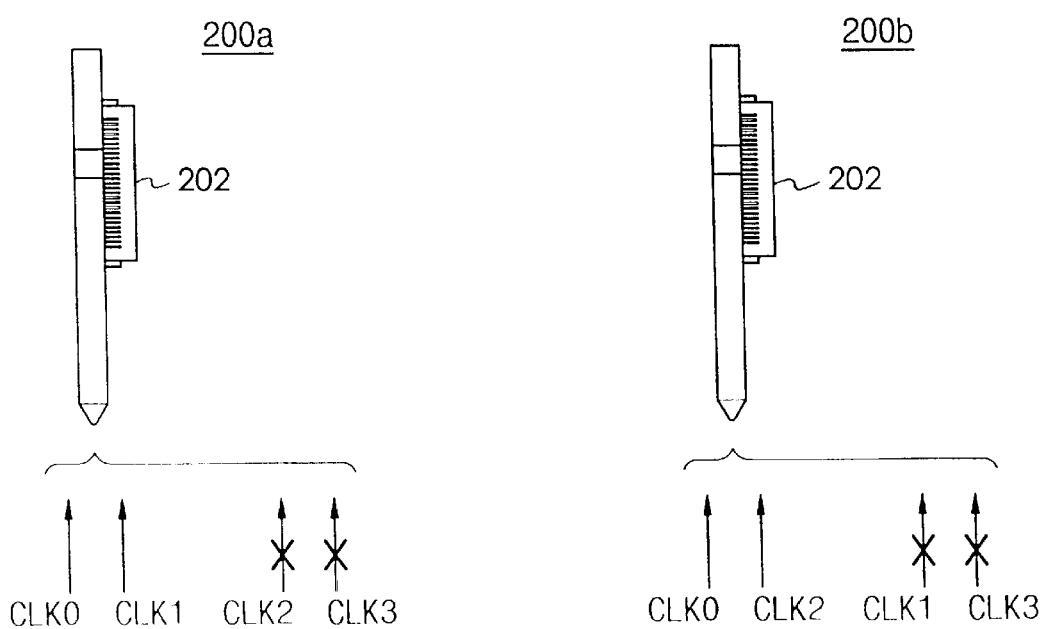
FIG. 6A is a cross-sectional view of a single-sided type memory module fitted for a 66 MHz system bus clock, showing application of the corresponding first through fourth clock signals CLK0 through CLK3.
FIG. 6B is a cross-sectional view of a single-sided type memory module fitted for a 100 MHz system bus clock, showing application of the corresponding first through fourth clock signals CLK0 through CLK3.
Figure 6C:
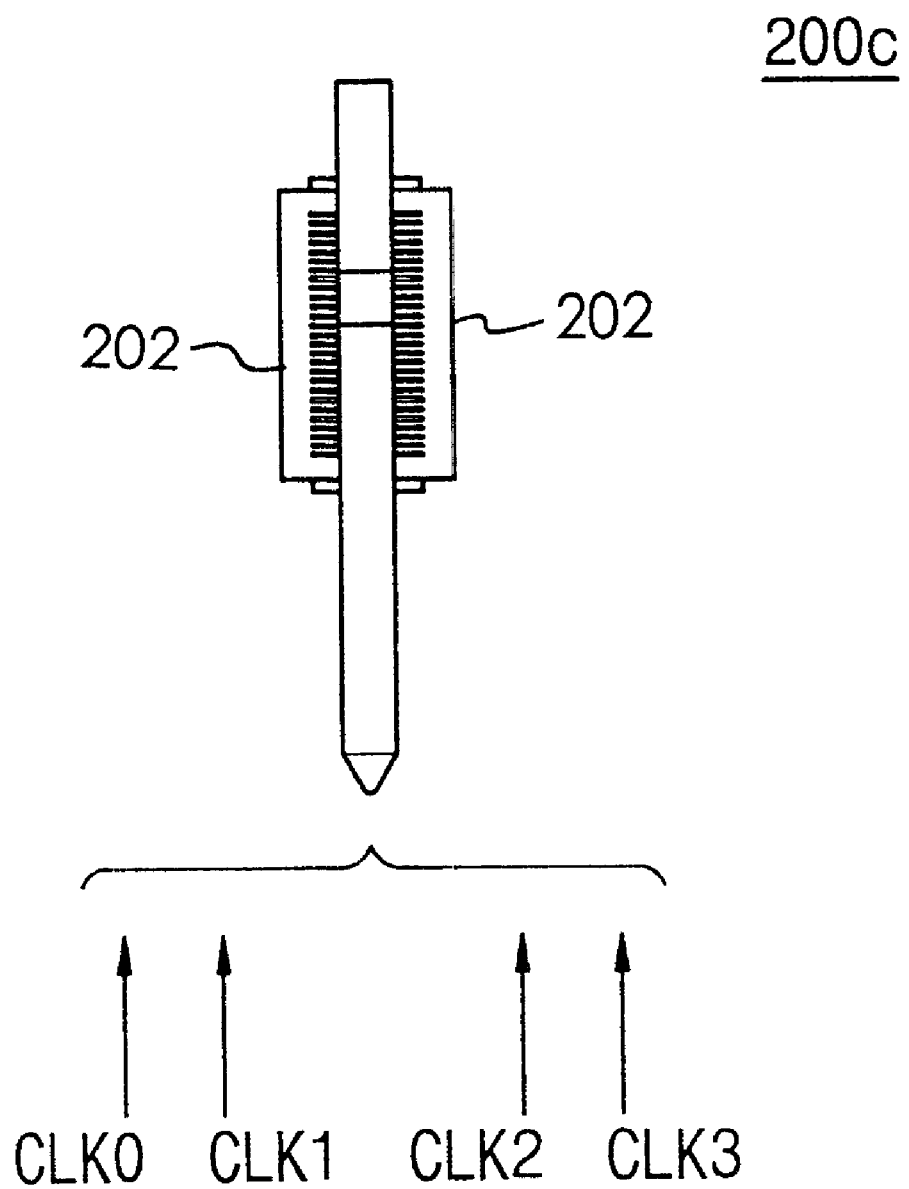
FIG. 6C is a cross-sectional view of a double-sided type memory module fitted for a 66/100 MHz system bus clock, showing application of the corresponding first through fourth clock signals CLK0 through CLK3.

As shown in FIG. 6A, 6B and 6C, memory module 200 may be either a single-sided type memory module 200a or 200b, or a double-sided type memory module 200c, that supports either a 66 MHz or a 100 MHz memory bus data transmission speed. The 66 MHz single-sided memory module 200a performs write and read operations with a first clock signal CLK0 and a second clock signal CLK1 applied to the front of the module, and a cut off a third clock signal CLK2 and a fourth clock signal CLK3 that would have otherwise been applied to the rear of the module. The 100 MHz single-sided memory module 200b performs write and read operations by inputting a first clock signal CLK0 and a third clock signal CLK2 to the front of the module, and cuts off application a second clock signal CLK1 and a fourth clock signal CLK3 to the rear of the module. The double-sided type memory module 200c however, is operated by inputting the first through fourth clock signals CLK0, CLK1, CLK2 and CLK3 irrespective of 66/100 MHz memory bus data transmission speed.

Figure 7B:
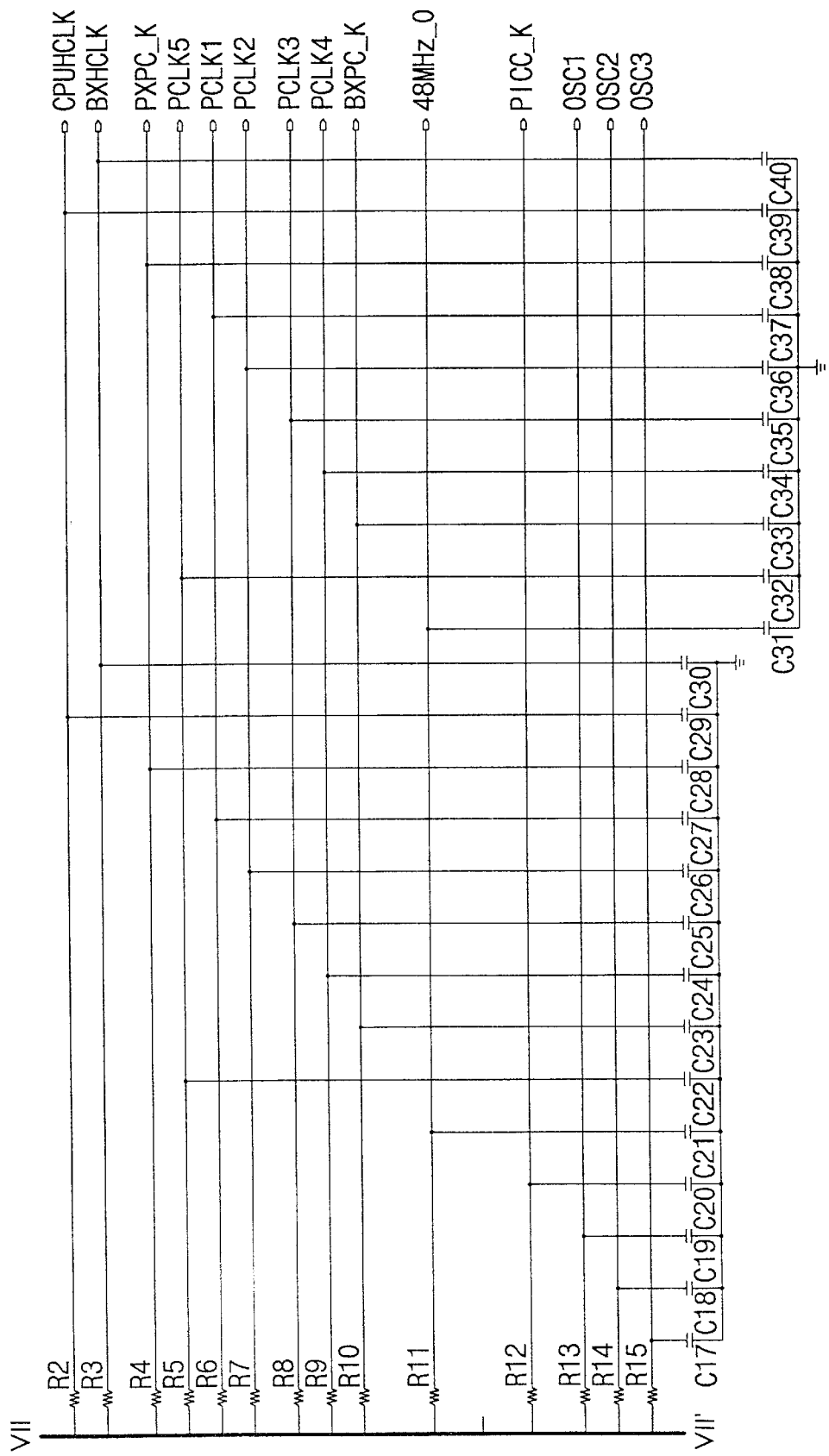
FIG. 7 is divided between FIG. 7A and FIG. 7B along line VII–VII' to illustrate a detailed circuit diagram for the clock generator shown in FIG. 3.

Referring now to FIGS. 7A and 7B, clock generator 126 receives a control signal 100_66# selecting a system bus clock signal from the CPU 102. Clock generator 126 also receives the memory data SMBDATA and SMBCLK from the PCI to ISA bridge controller 114 through the system management (i.e., SM) bus and then stores the data SMBDATA and SMBCLK in register 128. Accordingly, a host clock signal BXCLK fitted for either a 66 MHz or 100 MHz system bus clock signal is applied to host to PCI bridge controller 108, and central processing unit clock signals CPU CLK (CPU0 and CPU1) and PCI clock signals PCIF-PCI6 are output.

Figure 8:
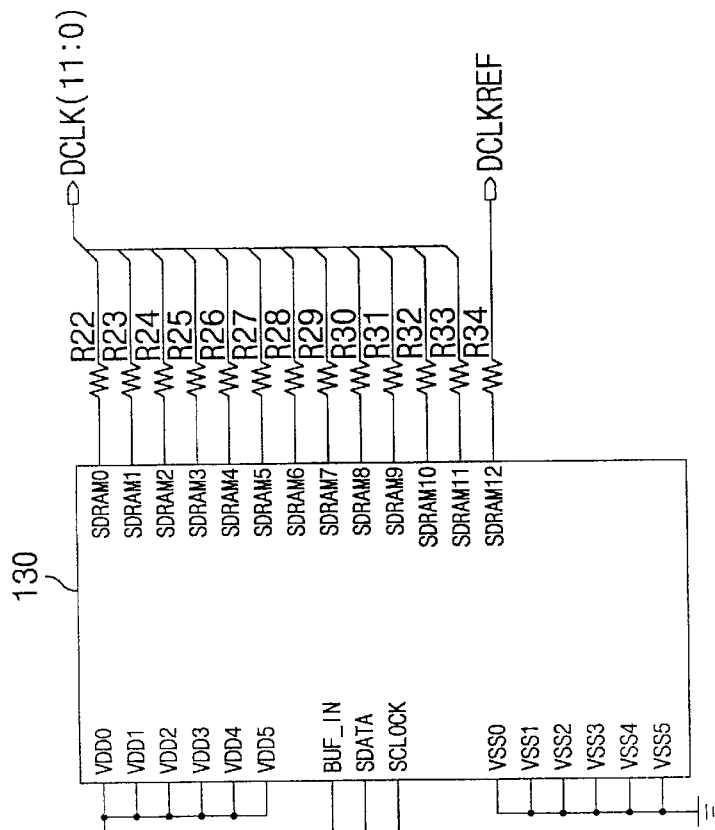
FIG. 8 is a detailed circuit diagram of the clock buffer shown in FIG. 3.
Figure 8:
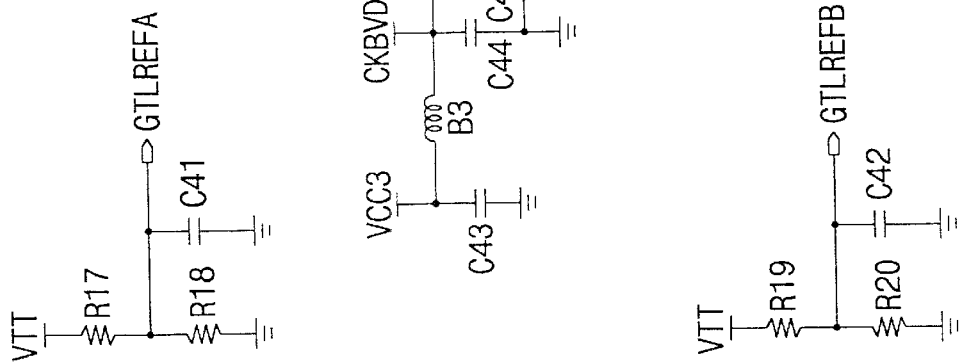

Turning now to FIG. 8, clock buffer 130 receives memory data SMBDATA and SMBCLK from PCI to ISA bridge controller 114 through the system management bus and then stores the data SMBDATA and SMBCLK in register 132 of clock buffer 130. Additionally, clock buffer 130 receives a reference clock signal DCLK0 corresponding to a either a 66 MHz or a 100 MHz system bus clock signal from the host to PCI bridge controller 108. Therefore, a memory module that has been inserted into one of memory module sockets 120, 122, 124 maybe either a 66/100 MHz single-sided type or double-sided type memory module because clock buffer 130 outputs first through fourth clock signals CLK0, CLK1, CLK2, CLK3 (DCLK[11:0]) to memory module sockets 120, 122, and 124.

Figure 9:
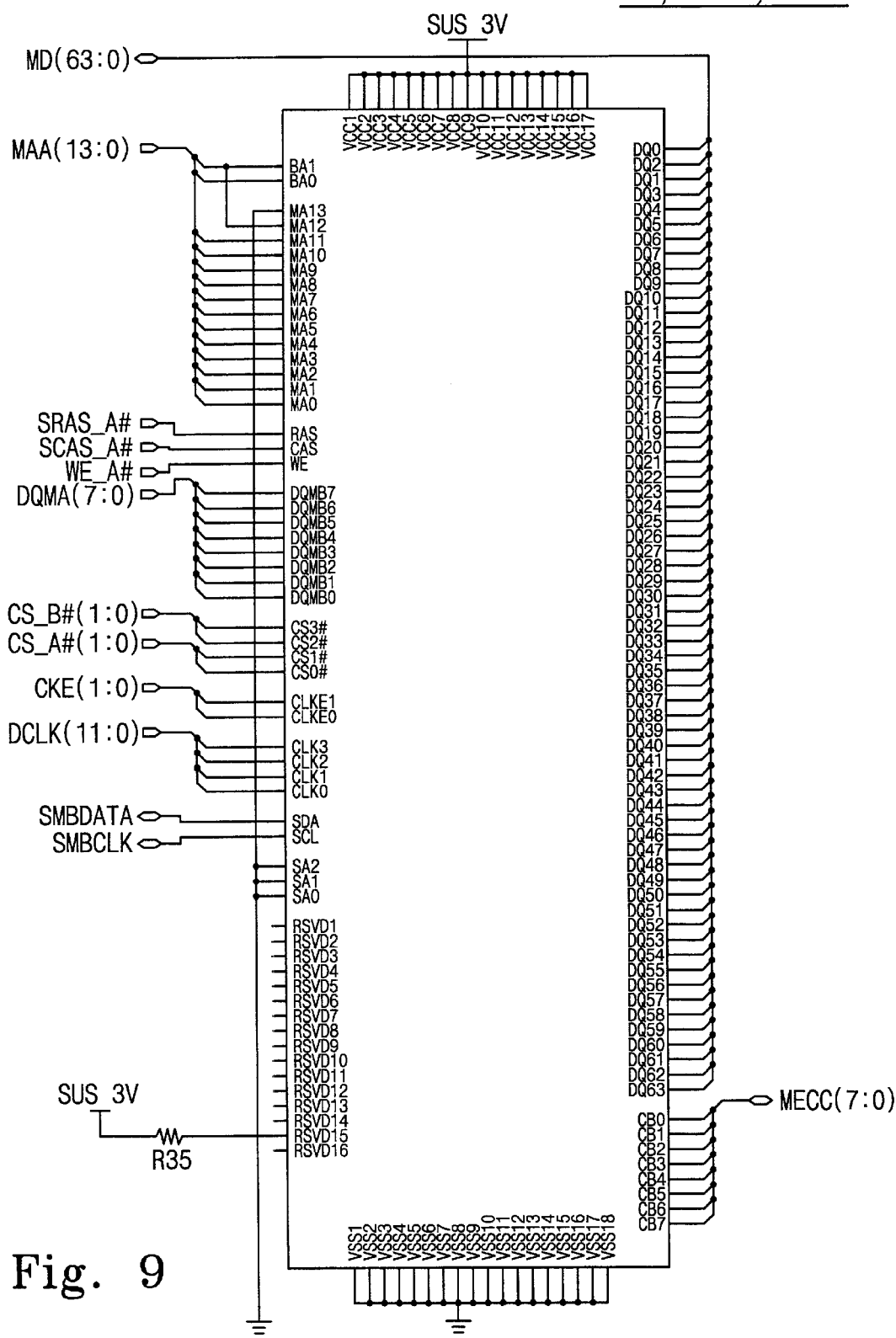
FIG. 9 is a detailed circuit diagram of one of the memory module sockets shown in FIG. 3.

FIG. 9 illustrates a circuit of each of the memory module sockets 120, 122, 124, and shows that a first through fourth clock signals CLK0, CLK1, CLK2, CLK3 are received from clock buffer 130 and the PCI to ISA bridge controller 114, and that mutual system management data SMBDATA, and a clock signal SMBCLK are transmitted through an SM bus.

Figure 10:
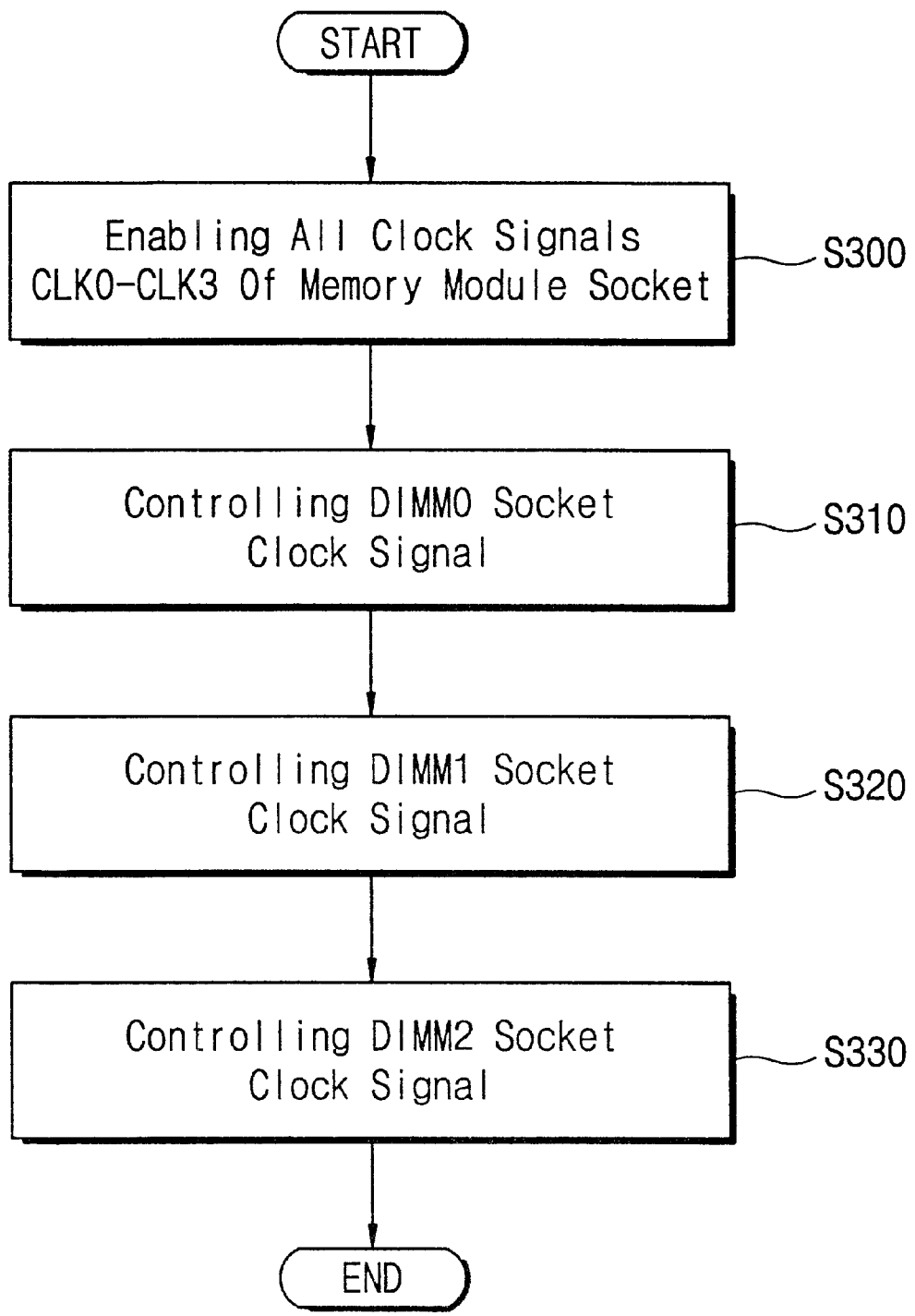
FIG. 10 is flow chart illustrating the steps for controlling the memory clock signals to an unoccupied memory module socket and an unused memory clock signal for an occupied memory module socket.

Referring to FIG. 10, if power is supplied to a computer system 100 in step S300, a basic input and output system 116 enables clock signals CLK0, CLK1, CLK2 and CLK3 to be applied to the first through third DIMM memory module sockets 120, 122, and 124 (or, alternatively, if more memory module sockets are mounted upon main board 8, to all of those sockets). In step S310, application of clock signals CLK0, CLK1, CLK2 and CLK3 to socket 120 are controlled in accordance with the earlier determination of whether any memory module has been inserted into the first DIMM memory module socket 120. Afterwards, in step S320, clock signals CLK0, CLK1, CLK2 and CLK3 to socket 120 are controlled in accordance with the earlier determination of whether any memory module has been inserted into the second DIMM memory module socket 122, and in step S330, clock signals CLK0, CLK1, CLK2 and CLK3 to socket 120 are controlled in accordance with the earlier determination of whether any memory module has been inserted into the first DIMM memory module socket 124. That is, the first through the fourth clock signals CLK0–CLK3 of each memory module socket are controlled in response to the initial determination of whether an inserted memory module supports a system bus and whether the memory module is a single-sided or a double-sided memory module.

Figure 11:
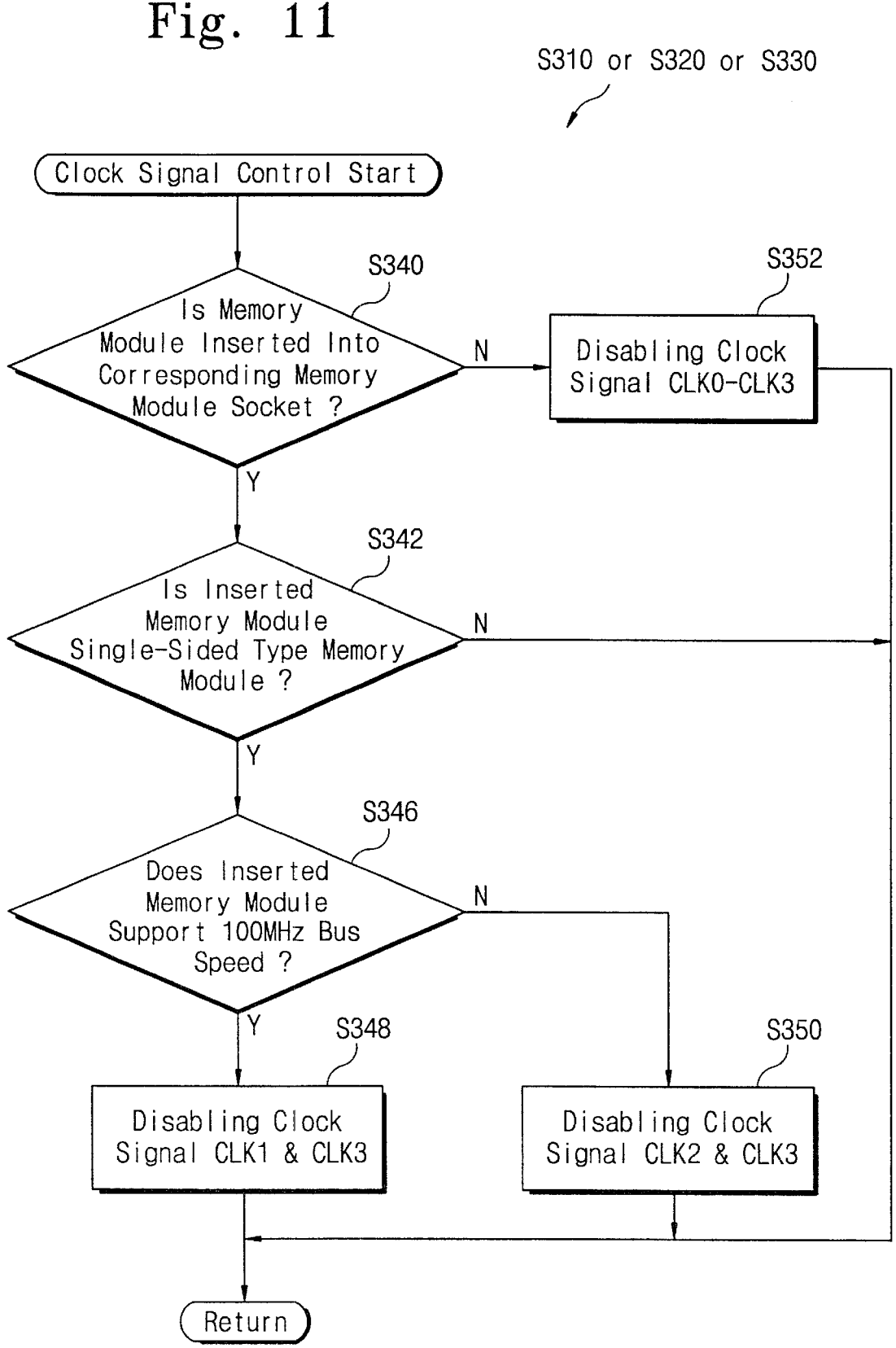
FIG. 11 is a flow chart illustrating the steps of controlling a memory clock signal for one memory module socket shown in FIG. 10.

Referring to FIG. 11, in step S340, a determination is made of whether any memory module is inserted into a memory module socket 120 or 122 or 124 where a first to a fourth memory clock signals CLK0–CLK3 have been enabled. If the determination is that no memory module has been inserted, step S340 proceeds to a step S352 and in step S352, application of all of the first through the fourth clock signals CLK0–CLK3 are disabled to that socket. If the determination establishes that a memory module has been inserted within the corresponding socket 120, 122, 124, step S340 proceeds to step S342 where a determination is made of whether the inserted memory module is a single-sided type memory module.

If the memory module is determined in step S342 to be a double-sided type memory module, the enabled first to fourth clock signals CLK0–CLK3 are maintained irrespective of memory bus clock speed. If the memory module is determined in step S342 however, to be a single-sided type memory module, the process proceeds to a step S346 where a determination is made of whether the inserted memory module supports a 100 MHz memory bus speed. If the determination establishes that the memory module supports a 100 MHz memory bus clock speed, clock signals which are not used in 100 MHz memory bus clock speed are disabled in step S348. That is, a second clock signal CLK1 and a fourth clock signal CLK3 are disabled. If the determination establishes that the memory module does not support a 100 MHz memory bus speed (i.e., the module supports a 66 MHz memory bus clock speed), step S346 proceeds to a step S350 where clock signals which are not used in a 66 MHz memory bus clock speed are disabled. That is, a third clock signal CLK2 and a fourth clock signal CLK3 are disabled.

A computer system used in the practice of this invention cuts off clock signals of not only an unused memory module socket but also an inserted memory module, thereby suppressing EMI (electromagnetic interference). The present invention may be embodied in other specific forms without departing form its spirit or essential characteristics. The described embodiments are to be considered in all respects only as illustrative and not restrictive. The scope of the invention is, therefore, indicated by the appended claims rather than the foregoing description.

What is claimed is:

1. A computer system including a processor outputting a control signal to generate a first or a second bus clock signal, and at least one memory module, comprising:
   a first system controller reading main data from said memory module and then outputting setting data corresponding to said main data;
   a clock generator outputting a first or a second HOST clock signal corresponding to said setting data in response to said control signal;
   a second system controller outputting a first or a second reference clock signal in response to said first or said second HOST clock signal; and
   a clock buffer receiving said first or said second reference clock signal and then outputting a first to a fourth memory clock signals corresponding to said setting data to said memory module,
   wherein, if said memory module is a single-sided type memory module, said clock buffer cuts off unused memory clock signals of said single-sided memory module among said first to said fourth memory clock signals through said setting data.

2. The computer system as defined in claim 1 wherein said first system controller transmits said memory data and said setting data through a SM (system management) bus.

3. The computer system as defined in claim 1 wherein said clock generator and said clock buffer includes a register storing said setting data.

4. The computer system as defined in claim 1 wherein, if said memory module is a single-sided type memory module, said clock buffer
   disables said second memory clock signal and said fourth memory clock signal when said first reference clock signal is inputted, and
   disables said third memory clock signal and said fourth memory clock signal when said second reference clock signal is inputted.

5. A method for controlling a computer system controlling a memory clock signal of at least one DIMM (dual in-line memory module), comprising the steps of:
   enabling a first to a fourth memory clock signals to all memory sockets;
   determining whether a memory module is inserted into a socket among said enabled memory sockets;

characterizing said inserted memory module when said memory module is determined to have been inserted into said socket;

maintaining said enabled first to fourth memory clock signals, if said memory module is a double-sided type memory module;

determinating whether a bus speed of said memory module is a first speed or a second speed, when said memory module is a single-sided type memory module;

disabling memory clock signals corresponding to said second speed of said memory module among said first to said fourth memory clock signals, if said bus speed is determined to be said first speed; and disabling memory clock signals corresponding to said first speed of said memory module among said first to said fourth memory clock signals, if said bus speed is determined to be said second speed.

6. The method as defined in claim 5, wherein said first to said fourth memory clock signals of a corresponding memory module socket are disabled, if said memory module is not inserted thereinto.

* * * * *